United States Patent [19]
Kanatani et al.

[11] 3,975,661
[45] Aug. 17, 1976

[54] DRIVING METHOD FOR A THIN-FILM ELECTROLUMINESCENT ELEMENT OF A THREE-LAYER CONSTRUCTION

[75] Inventors: Yoshiharu Kanatani; Masahiro Ise; Etsuo Mizukami, all of Tenri; Chuji Suzuki, Nara, all of Japan

[73] Assignee: Sharp Kabushiki Kaisha, Osaka, Japan

[22] Filed: June 19, 1974

[21] Appl. No.: 480,723

[30] Foreign Application Priority Data
June 19, 1973 Japan .................................. 48-69440

[52] U.S. Cl. .......................... 315/169 TV; 313/494; 313/498; 315/176
[51] Int. Cl.² .......................................... H05B 37/00
[58] Field of Search ........... 313/498, 501, 506, 507, 313/494, 510; 307/298; 315/150, 153, 169 TV, 176

[56] References Cited
UNITED STATES PATENTS

| | | | |
|---|---|---|---|
| 3,309,712 | 3/1967 | Cole .............................. | 313/506 X |
| 3,315,080 | 4/1967 | Kohashi .......................... | 313/507 X |
| 3,356,899 | 12/1967 | Stone ............................. | 313/510 X |
| 3,500,101 | 3/1970 | Burns ............................ | 313/507 X |
| 3,526,801 | 9/1970 | Kruse ............................ | 313/501 |

Primary Examiner—R. V. Rolinec
Assistant Examiner—Lawrence J. Dahl
Attorney, Agent, or Firm—Stewart and Kolasch, Ltd.

[57] ABSTRACT

Disclosed is a driving method for a thin-film electroluminescent element of a three-layer construction which emits light and exhibits the hysteresis phenomenon within the light emission versus applied voltage characteristics. The light intensity is maintained and memorized at a predetermined value in the element by the application of a train of sustaining pulses of alternating voltage, the amplitude thereof being chosen at the voltage level appearing at the point in the hysteresis loop characteristics where the difference between the maximum light brightness on the voltage decreasing curve and the minimum light brightness on the voltage increasing curve is considerably large. The sustaining light brightness is controlled by varying the amplitude or the pulse width of the sustaining pulses. The information may be written, memorized and eliminated in the EL element as variations of the light brightness. To write or eliminate the information in the EL element, it is also effective to utilize external light excitation.

16 Claims, 10 Drawing Figures

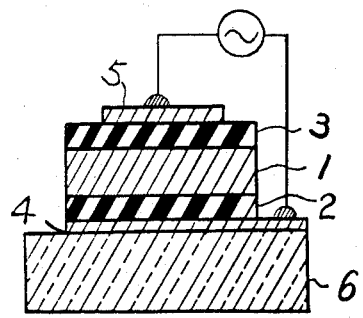
FIG. 1
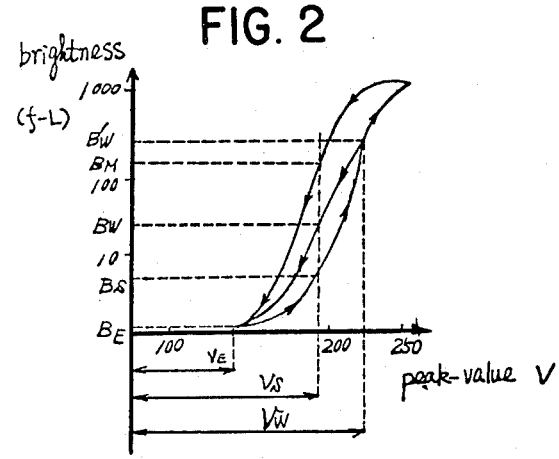
FIG. 2
FIG. 3
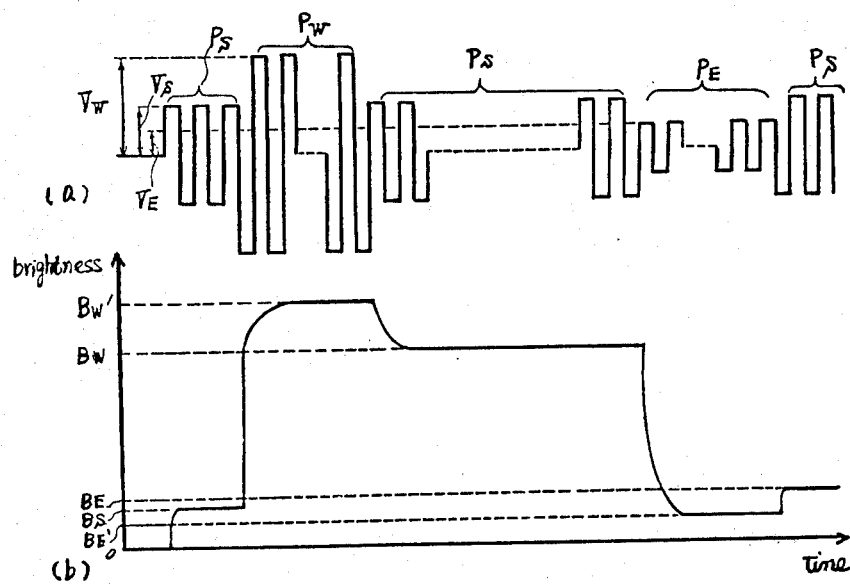
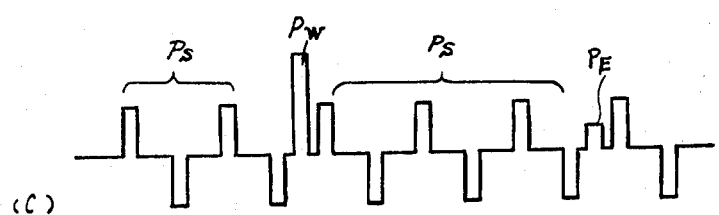

DRIVING METHOD FOR A THIN-FILM ELECTROLUMINESCENT ELEMENT OF A THREE-LAYER CONSTRUCTION

BACKGROUND OF THE INVENTION

The present invention relates to a driving method for causing a thin-film electroluminescent element of a three-layer construction which exhibits the hysteresis phenomenon within the light emission versus applied voltage characteristics to have the function of memorizing information in a dynamic fashion.

The electroluminescence phenomenon was discovered in the 1930's, and after that the engineering application and the peculiarities of the phenomenon have been studied by many research workers. The solid-state electronics technologies have highly advanced in recent years and a variety of application of such electroluminescence phenomenon have been desired.

OBJECTS AND SUMMARY OF THE INVENTION

The novel phenomenon has been discovered by the inventor's studies that a thin-film electroluminescent element, such as a ZnS thin-film EL element, of a type having an electroluminescent layer sandwiched by a pair of dielectric layers, not only shows excellent electroluminescence but also exhibits the hysteresis phenomenon within the light emission versus applied voltage characteristics. It is possible to cause the abovedescribed EL element to have the function of memorizing information by utilizing the hysteresis phenomenon.

Accordingly, it is an object of the present invention to provide a driving method for writing, memorizing and eliminating the information in a thin-film electroluminescent element of a three-layer construction which emits light and exhibits the hysteresis phenomenon within the light emission versus applied voltage characteristics in a manner to control the intensity of the light emission.

It is another object of the present invention to provide a driving method to read-out the information written in the electroluminescent element which can emit light and exhibit the hysteresis phenomenon within the light emission versus applied voltage characteristics in the mode of non-destructive reading.

In order to achieve the above-mentioned objects, pursuant to the teachings of the present invention, alternating voltage pulses for driving the electroluminescent element are controlled in a fashion of amplitude modulation, pulse-repetition rate modulation or pulse-width modulation, and hence the light brightness of the element is controlled, whereby the information is written, memorized and eliminated by varying the intensity of the light emission of the element. In order to read-out the information written in the element in a non-destructive reading fashion, polarization current in the element is detected, the polarization current occurring only when the element emits light.

When light-excited polarization effects or light-excited depolarization effects which are the characteristics of the electroluminescent element exhibiting the hysteresis phenomenon are utilized, the information may by written or eliminated in response to external application of light irradiation in addition to application of alternating voltage pulses.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a sectional view of a thin-film electroluminescent element of a three-layer construction;

FIG. 2 is a graph showing hysteresis properties included within light emission versus applied voltage characteristics of the element of FIG. 1;

FIGS. 3a, 3b and 3c are time charts for the purpose of explanation of a first embodiment of the present invention;

DESCRIPTION OF THE PREFERRED EMBODIMENTS

Figure 4:
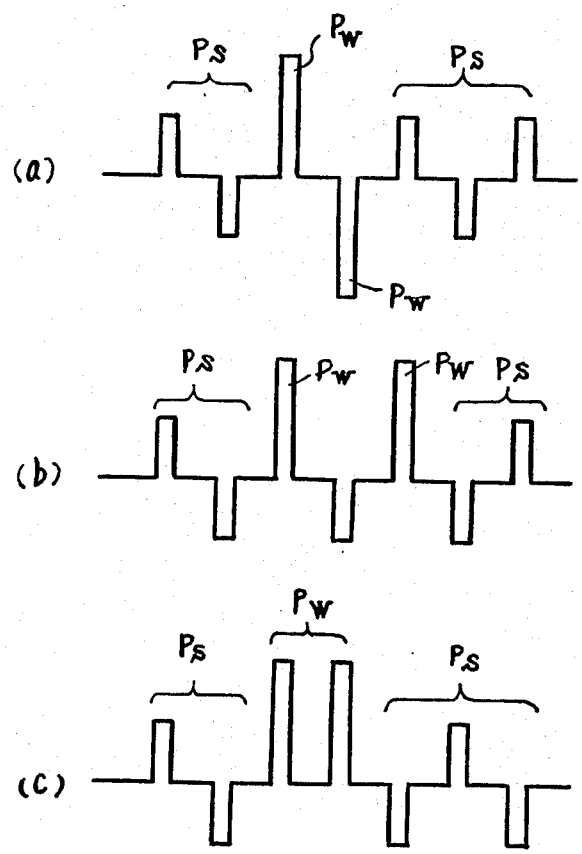
FIGS. 4a, 4b and 4c are time charts showing modifications of the first embodiment of FIG. 3.

Referring now to FIG. 1, there is illustrated an thin-film electroluminescent element of a three-layer construction, which comprises an electroluminescent thin film 1 made of ZnS, and a pair of transparent dielectric layers 2, 3 made of appropriate materials $Y_2O_3$, etc. The EL element includes further a transparent electrode 4 made of $SnO_2$, etc., and a metal rear electrode 5 made of Al, etc. As well known in the art, the ZnS thin-film 1 is doped with transition elements such as Mn, Cr or rare earth elements such as Tb, Er, Tm, Yb, these active materials serving as the luminescent center. A glass substrate 6 provides a structural support for the stratified construction.

It is well known that the above-described thin-film EL element provides electroluminescent light emission upon application of alternating voltage pulses. Recently, the inventors have discovered the new phenomenon that such EL element shows light-excited polarization effects and light-excited depolarization effects. The light-excited polarization effects mean the phenomenon that a light-excited polarization electric field occurs within the electroluminescent layer upon light excitation under the conditions where such EL element is biased by a DC voltage. The light-excited depolarization effects mean the phenomenon that the polarization electric field formed due to the light-excited polarization effects is reduced upon light excitation after the termination of the application of the DC voltage.

The inventors also have discovered the phenomenon as another important characteristic of the ZnS thin-film electroluminescent element that the element exhibits the hysteresis phenomenon within the light emission versus applied alternating voltage characteristics. The hysteresis phenomenon appears remarkably by appropriately selecting the material of the dielectric layers and manufacturing method or manufacturing factors for the EL element.

The present invention is to provide a driving method for causing the EL element to have the function of memorizing by utilizing such hysteresis phenomenon which was discovered, for example, in the ZnS thin-film electroluminescent element.

The driving method for the EL element will be described in detail together with the hysteresis phenomenon with reference to the drawings showing the embodiments of the present invention.

In FIG. 2, showing the hysteresis phenomenon of the ZnS thin-film electroluminescent element of FIG. 1, the axis of abscissas shows a peak value ($\frac{1}{2} V_{p-p}$) V of applied alternating voltages and the axis of ordinates shows the brightness of light emission B (f—L), respectively. It is clear from the graph that the element exhibits the hysteresis phenomenon between the characteristic increasing curve and the falling curve. The hysteresis phenomenon shown in FIG. 2 relates to the general tendency of the above-described ZnS EL element of a three-layer construction, and the value of the hysteresis phenomenon varies in response to formation factors in evaporating the thin-film such as thin-films made of ZnS, and $Y_2O_3$, and in response to the combination of ZnS and dielectric layers.

Referring now to FIGS. 3a, 3b and 3c, these show time charts for the purpose of explanation of an embodiment of the present invention utilizing the hysteresis phenomenon, wherein amplitude modulation or the peak value modulation on applied alternating pulses is employed to write into and eliminate information from the element.

FIGS. 3a and 3b show the wave form of applied pulses to a ZnS thin-film EL element of a three-layer construction, and the variations of brightness of light emission from the EL element, respectively. The axes of abscissa show time t in the both Figures. Though the embodiment relates to a driving method wherein pulses of the duty factor of 50% and of no DC offset are applied to the element, it may be also effective to apply the sine wave voltage ar the distorted wave voltage.

The ZnS EL element of a three-layer construction maintains light emission at the brightness Bs (f—L) upon the application of sustaining pulses Ps, the peak value of which is at the voltage level Vs appearing at the point where the minimum light brightness Bs on the brightness increasing curve is considerably little whereas the maximum light brightness $B_M$ on the brightness decreasing curve is considerably large as shown in FIG. 2. And therefore the EL element emits little light, at the brightness Bs, upon the application of the sustaining pulses Ps as shown in FIG. 3(B). The element emits light instantaneously at the brightnesss $B_W$ (f—L) upon the application of writing pulses $P_W$, the peak value thereof being at the voltage level $V_W$. Then the element maintains light emission at the stable intensities $B_W$ upon application of following sustaining pulses Ps. It is clear from FIG. 2 that the stable light emission brightness as for the following sustaining pulses Ps may be changed and selected between the maximum value $B_M$ and the minimum value Bs by varying the voltage level $V_W$ of the writing pulses $P_W$, thereby achieving halftone read out mode. In accordance with the teaching of the above-described driving method, the information may be written and memorized in the element in such a way as described in detail below. The analysis of operation of the EL element in the information writing process is as follows: electric current little appears in the ZnS (Mn) electroluminescent layer 1 when the sustaining pulses are applied to the element and the amplitude Vs of the sustaining pulses is located within a range under the emission threshold level, though the emission threshold level of the EL element is not clear and accurate. When the high amplitude positive writing pulses $P_W$ are, for example, applied to the metal rear electrode 5 made of Al, etc., against the transparent electrode 4, primary electrons are emitted from a deep trap level captured at the boundary area between the dielectric layer 2 and the ZnS (Mn) electroluminescent layer 1. The primary electrons cause secondary electrons to be emitted successively in the ZnS (Mn) electroluminescent layer 1 having a high electric field, and hence sufficient avalanche current appears. The avalanche current cause the EL element to emit light by activating the luminescent center.

The other boundary surface between the dielectric layer 3 and the ZnS (Mn) electroluminescent layer 1 has a deep trap level. The secondary electrons caused by the application of the high amplitude writing pulses $P_W$ are captured at the trap, thereby creating a polarization electric field in a direction of cancelling the external applied electric field. And hence, the internal electric field, the intensity of which is reduced by the polarization electric field from the external applied electric field, is almost maintained at a fixed value.

When the sustaining pulse Ps of an opposite polarity to that of the writing pulse is applied to the element, even though the amplitude of the sustaining pulses is located within a range under the emission threshold level, the electric field within a range over the emission threshold level is effectively created by superimposing the external applied electric field on the polarization electric field created by the application of the writing pulses. The superimposed electric field causes the sufficient avalanche current in the electroluminescent layer, and hence the polarization electric field is inverted and at the same time electroluminescence is carried out. Accordingly, when a train of consecutive alternating current sustaining pulses Ps is applied to the EL element, the EL element maintains light emission with the result of inversion of the polarization electric field.

More specifically, the external applied electric field is superimposed on the polarization electric field at the time when the sustaining pulses change their polarity, thereby creating sufficient avalanche current and causing the light emission and inverting the polarization electric field. The above-described phenomenon and hence the light emission is maintained as long as the alternating sustaining pulses are applied. Apparently, the element may operate in the same way even though the negative writing pulses $P_W$ are applied to the metal rear electrode 5 against the transparent electrode 4.

Once the polarization electric field is quenched by an appropriate means, the light emission is inhibited even when the following sustaining pulses Ps are applied to the element. That is, the written information may be eliminated. One way of eliminating the information with the use of amplitude modulation will be explained with reference to FIG. 3. Eliminating pulses $P_E$ are instantaneously applied to the element which are stably emitting light at the brightness $B_W$ upon the application of sustaining pulses Ps, the voltage or the peak value of the eliminating pulses being at the voltage level $V_E$ which is considerably lower than the sustaining voltage Vs. Upon the application of the eliminating pulses, the element scarcely emits light at the brightness $B_E'$. And the element again maintains stable light emission at the brightness Bs upon the application of a following train of sustaining pulses Ps. The memorized brightness $B_W$ is reduced to the minimum value in this way.

By the way, it is necessary but difficult to select the appropriate number and amplitude of the eliminating pulses $P_E$ in order to maintain the light emission at the brightness Bs after the elimination. In general, the light emission is maintained at the brightness $B_E$ which is rather higher than the brightness Bs.

In the above-explained embodiment, the information may be written and eliminated by varying the light emission with the use of amplitude modulation of the sustaining pulses Ps and the information may be memorized in a dynamic fashion by the application of the sustaining pulses Ps. In other words, the ZnS (Mn) electroluminescent element may operates as a memorizing function element. The light brightness is controllable within a range from the minimum brightness Bs to the maximum brightness $B_M$ by varying the amplitude of the writing pulses $P_W$, and therefore the half-tone brightness is obtainable. This is very effective when the element is used as a display device. The half-tone brightness within a range from Bs to $B_W$ may be also obtainable by varying the number or the amplitude of the eliminating pulses $P_E$.

A train of sustaining alternating pulses which have pause periods where zero voltage appears, as shown in FIG. 3c, are also available to drive the element, because the present EL element has the characteristics to maintain the polarization electric field by itself. When the sustaining pulses having the pause periods are used for driving the element, the writing pulses $P_W$ or the eliminating pulses $P_E$ may be positioned at the pause periods of sustaining pulses Ps, as shown in FIG. 3c.

FIGS. 4a, 4b and 4c show the modifications of positioning the writing pulses. FIG. 4a shows the case where the writing pulses $P_W$ are applied continuously over more than one cycle period, FIG. 4b shows the case where the writing pulses $P_W$ are selected at a polarity but not the alternating polarity, and FIG. 4c shows the case where the writing pulses $P_W$ are applied in a period when the sustaining pulses Ps are at zero voltage level.

The hysteresis loop shown in FIG. 2 corresponds to the case where the applied voltage pulses continuously change the amplitude thereof. When the applied voltage pulses have the zero voltage periods as shown in FIG. 3c and FIGS. 4a, 4b and 4c, the maximum writing brightness $B_M$ and the eliminate brightness Bs are obtainable only where the pulse number and the amplitude of the writing pulses $P_W$ and the eliminating pulses $P_E$ are fixed at the appropriate values. By utilizing the hysteresis phenomenon, the half-tone modulation may be obtainable by varying the pulse number or the amplitude of these pulses.

Figure 5:
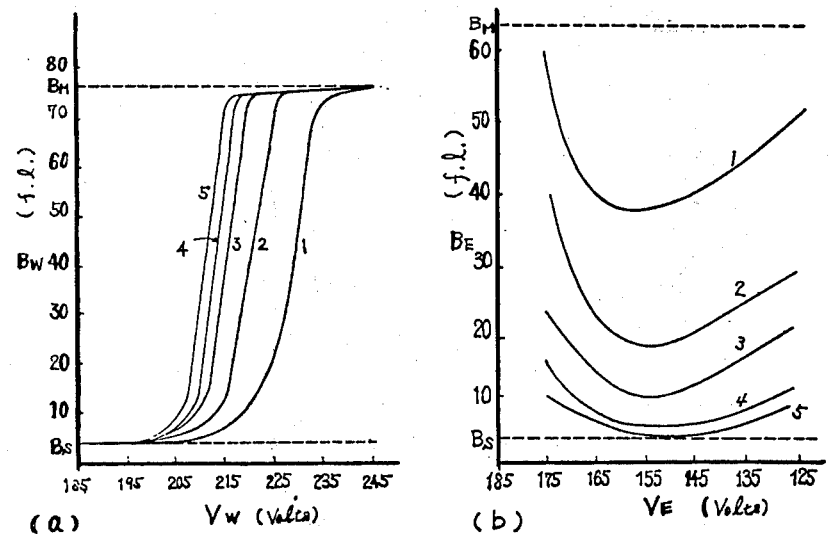
FIGS. 5a, 5b, 5c and 5d are graphs for the purpose of explanation of half tone modulation in the first embodiment of FIG. 3.
Figure 5:
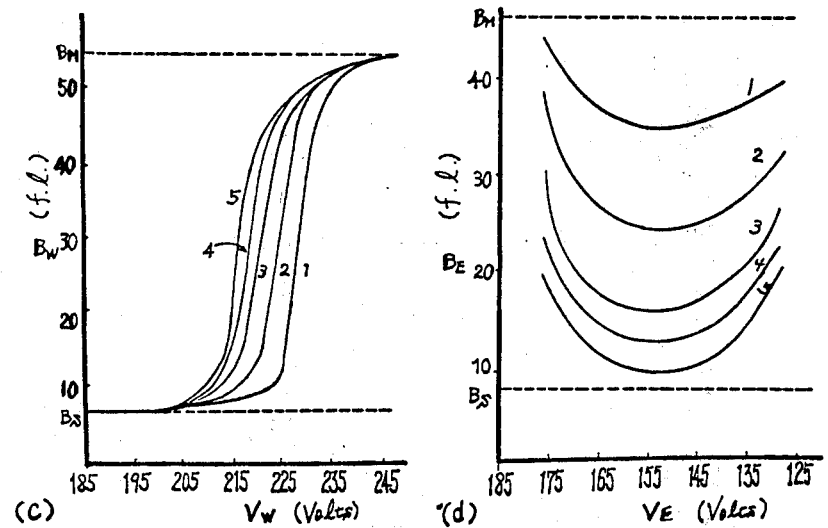

FIGS. 5a, 5b, 5c and 5d show the relationship between the voltage of the writing or eliminating pulses and the sustaining emission brightness as a function of the number of pulses. FIG. 5a shows the relationship in the case where the writing pulses are applied over the more than one cycle period as shown in FIG. 4a, the relationship being shown as a function of the number of cycles of the writing pulses. FIG. 5b shows the relationship in the case where the cyclic eliminating pulses are applied to the element, the relationship being shown as a function of the number of cycles of the eliminating pulses. FIGS. 5c and 5d show the relationship as a function of the number of pulses, where the writing pulses and eliminating pulses are of the same polarity. In the graphs, the axis of abscissas shows an amplitude or a peak value $V_W$ and $V_E$ of the applied pulses, whereas the axis of ordinates shows the brightness of light emission $B_W$ and $B_E$.

The appended numerals 1, 2, 3, 4 and 5 show the number of cycles of the applied pulses, or the number of pulses of applied pulses of the same polarity. In this embodiment the sustaining pulses are selected to have the peak value Vs at the voltage level 185V, the duty factor of 50% and the frequency of 8 $KH_z$ and the eliminating pulses are applied to the element which is emitting light at the brightness $B_M$.

It is clear from these graphs that the half-tone mode display may be obtainable by controlling the applied number of pulses or the peak value of the writing pulses and eliminating pulses. And it is also clear that the necessary number of pulses of the eliminating pulses for attaining the complete elimination exceeds five.

The foregoing description relates to a driving method for writing, memorizing and eliminating the information in the EL element by means of the amplitude modulation of the applied alternating sustaining pulses Ps. The following description relates to a driving method in a fashion of pulse-width modulation.

The inventors have discovered the following phenomenon. When the pulse-width of the applied pulses to the ZnS (Mn) EL element are varied, the physteresis phenomenon appears in the characteristics even though the amplitude of the applied pulses are maintained at a fixed value. That is, the luminescence state may be controlled by varying the pulse-width W of the applied pulses, thereby writing or eliminating the information and achieving the half-tone modulation.

Figure 6:
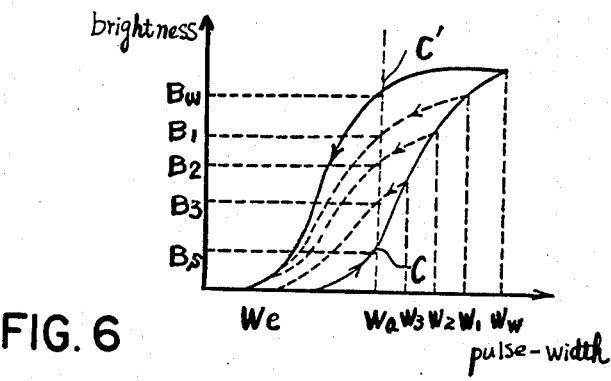
FIG. 6 is a graph showing hysteresis properties included within light emission versus applied pulse width characteristics.

FIG. 6 shows the hysteresis properties as a function of pulse-width, wherein the axis of abscissas shows the pulse-width W and the axis of ordinates shows the brightness of light emission B. The amplitude of the applied pulses approximates the amplitude of the sustaining pulses Ps. The embodiment of the pulse-width modulation driving method will be described with reference to FIG. 7 which is a time chart of the applied pulses to the EL element. A train of alternating pulses Q comprises sustaining pulses Qa of a pulse-width Wa chosen at the pulse-width appearing at the point in the hysteresis loop characteristics of FIG. 6 where the difference between the maximum light brightness $B_W$ and the minimum light brightness Bs is considerably large. When the sustaining pulses Qa are applied to the element, in the initial state, the element stably emits little light at the point C on the characteristic loop of FIG. 6. The state is maintained in a dynamic fashion by application of the train of the sustaining pulses Qa.

The pulse-width modulation is carried out as regards the sustaining pulses Qa and a writing pulse $Q_W$ of a wide pulse-width Ww is applied to the element in order to write the information thereto. The element instantaneously emits light at a considerably large brightness, and thereafter stably emits light at a brightness Bw at the point C' of FIG. 6 upon application of the following sustaining pulses $Qa_1$. The information is written into the element in such a way, and the state is maintained in a dynamic fashion by application of the sustaining pulses Qa.

Figure 7:
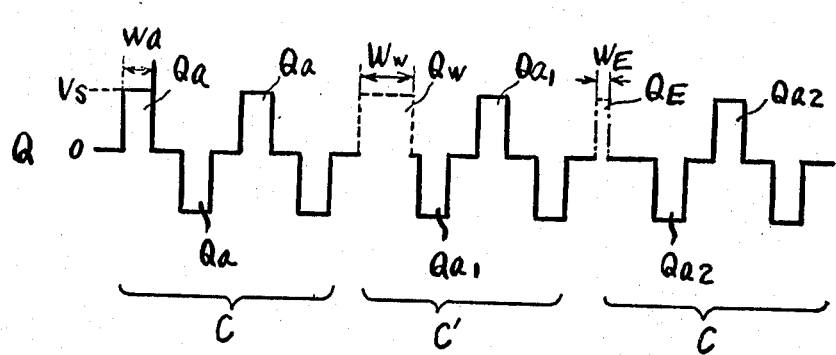
FIG. 7 is a time chart for the purpose of explanation of a second embodiment of the present invention.

An eliminating pulse $Q_E$ of a considerably narrow pulse-width $W_E$, as shown in FIG. 7, may be applied to the element in order to eliminate the information written therein. The element maintains the eliminated state at the point C by application of the following sustaining pulses $Qa_2$.

When the pulse-width Ww of the writing pulse Qw is chosen at the pulse-widths $W_1$, $W_2$, or $W_3$, the element maintains its emission state at a point on the line C − C′ by application of the following sustaining pulses $Qa_1$, thereby enabling a half-tone writing.

Figure 8:
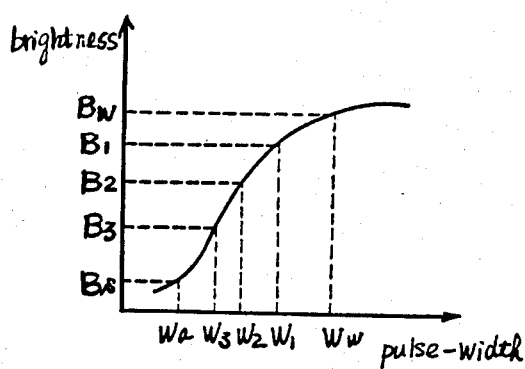
FIG. 8 is a graph for the purpose of explanation of the second embodiment of FIG. 7.

FIG. 8 shows the relationship between the pulse-width Ww of the writing pulse Qw and the brightness of light emission B. It will be appreciated from the graph that the half-tone writing and displaying at the brightnesses $B_1$, $B_2$, $B_3$, . . . . between the brightness Bw and Bs may be obtained by varying the pulse width Ww of the writing pulse. This is very effective in constructing the display device with the use of such element.

The half-tone modulation may be also achieved by varying the pulse-repetition rate of the writing or eliminating pulses in this embodiment as well as the driving method of the amplitude modulation type.

Figure 9:
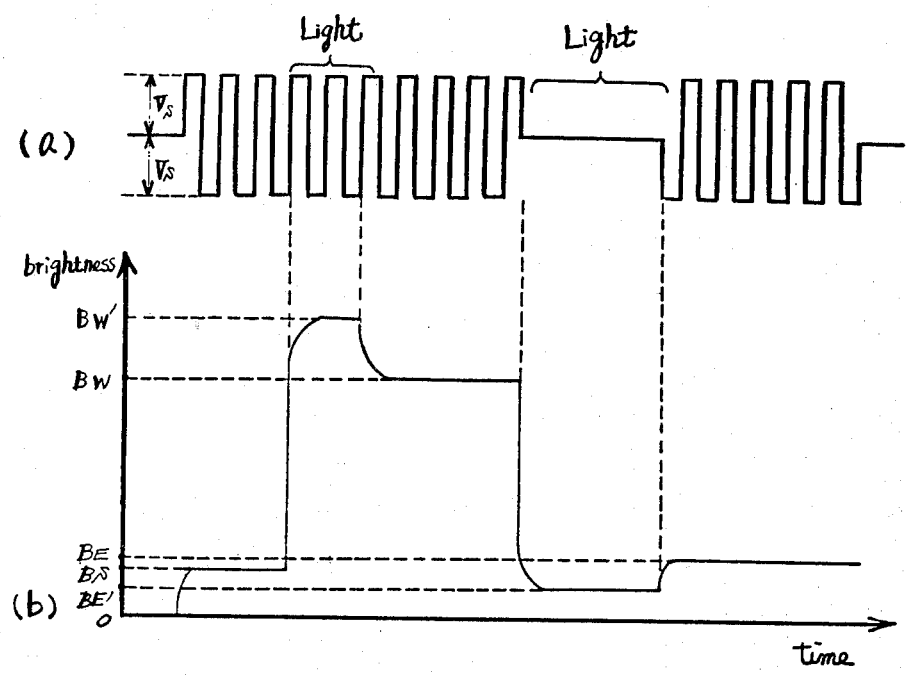
FIGS. 9a, 9b and 9c are time charts for the purpose of explanation of a third embodiment of the present invention.
Figure 9:
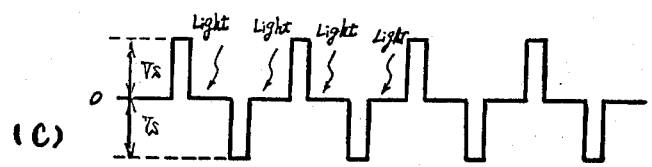

Referring now to FIGS. 9a, 9b and 9c, there is shown another embodiment of the driving method of the present invention, wherein external light exposure is used for writing and eliminting the information in the element. FIGS. 9a and 9c show wave forms of applied pulses to the El element, and FIG. 9b shows the brightness of light emission from the element upon application of pulses shown in FIG. 9a.

The element stably emits little light at the brightness Bs upon application of a train of sustaining pulses Ps. When the element is exposed to the external light, the writing process is carried out and the element instantaneously emits light at the brightness Bw′, and afterward the element maintains light emission at the sustaining brightness Bw upon application of the following sustaining pulses Ps. the analysis of the writing operation is as follows: When the external light is applied onto the element which is receiving the sustaining pulses Ps, primary electrons are emitted from a deep trap level captured at the boundary surface between the dielectric layer and the ZnS (Mn) electroluminescent layer. And hence the sufficient avalanche current appears in the EL layer. That is, the external light exposure has the same effects as the writing pulses. When the external light is applied at the pause period of the sustaining pulses Ps, the internal polarization electric field formed by the writing operation is depolarized or reduced, thereby enabling of elimination the information. The external light exposure for eliminating the information must be timed with the pause period of the sustaining pulses, as shown in FIGS. 9a an 9c.

The writing effects and the eliminating effects increase correspondingly as the wave length of the exposed light is short, and the intensity of the effects corresponds to the quantity of light exposure I.t, where I is the intensity of external light and t is the time period of light exposure.

The half-tone moduration in writing or eliminating operation may be achieved by varying the quantity of light exposure. The present EL element is very useful for the light image pattern display, since the element can display the half-tone in accordance with the variation of the external light exposure.

The foregoing description relates to the writing, memorizing and eliminating operation in the element.

The written in information in the element is read-out in a non-destructive reading fashion by detecting the polarization current in the EL element.

Figure 10:
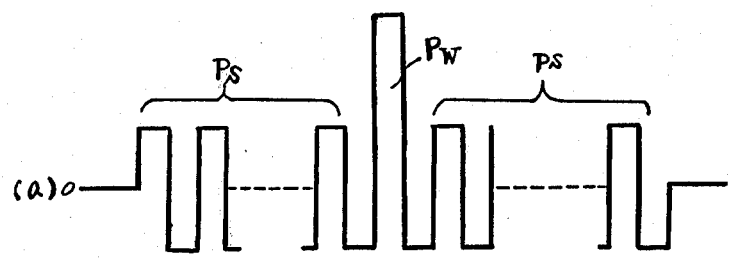
FIGS. 10a and 10b are time charts for the purpose of explanation of a method to read-out the information written in the element in a mode of the non-destructive reading.
Figure 10:
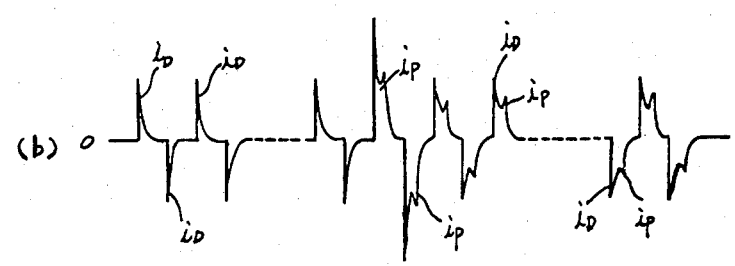

FIG. 10a shows the wave form of signals applied to the element, and FIG. 10b shows the wave form of the electric current in the El element. When the alternating sustaining pulses Ps are applied to the element, displacement current iD is caused by the capacity of the element. When the writing pulse Pw is applied to the element, the element emits considerably strong light and the polarization current ip appears in addition to the displacement current iD in the element. The polarization current ip occurs when the polarization electric field formed in the electroluminescent layer 1 is inverted upon application of alternating pulses. The information written in the element may be read-out in a non-destructive reading fashion by detecting the polarization current ip.

In accordance with teachings of the present invention, the character display, the pattern memory panel, and the peripheral controller which can write or eliminate the information with the use of a light pen may be accomplished with ease by utilizing the present EL element.

The invention being thus described, it will be obvious that the same may be varied in many ways. Such variations are not to be regarded as a departure from the spirit and scope of the invention, and all such modifications are intended to be included within the scope of the following claims.

We claim:

1. A driving method for a thin-film electroluminescent element comprising an electroluminescent layer sandwiched between two transparent dielectric layers forming a sandwiched structure, said electroluminescent layer having a given threshold voltage level for initiating electroluminescence therein and said sandwiched structure exhibiting the hysteresis loop phenomenon within the light emission versus applied voltage characteristics along the increasing and the decreasing process of the amplitude of the applied voltage where the applied voltage exceeds the threshold level, comprising the step of;

applying alternating sustaining pulses to the element for maintaining the light emission, the amplitude of the sustaining pulses being chosen at the voltage level appearing at the point in the hysteresis loop characteristics where the difference between the minimum light brightness on the voltage increasing curve and the maximum light brightness on the voltage decreasing curve is substantially a maximum.

2. A driving method for a thin-film electroluminescent element comprising an electroluminescent layer sandwiched between two transparent dielectric layers forming a sandwiched structure, said electroluminescent layer having a given threshold voltage level for initiating electroluminescence thereon and said sandwiched structure exhibiting the hysteresis phenomenon within the light emission versus applied voltage characteristics along the increasing and the decreasing process of the amplitude of the applied voltage where the applied voltage exceeds the threshold level, comprising the steps of;

applying alternating sustaining pulses to the element for maintaining the light emission, the amplitude of the sustaining pulses being chosen at the voltage level appearing at the point in the hysteresis loop characteristics where the difference between the minimum light brightness on the voltage decreasing curve is substantially a maximum;

applying writing pulses to the element, the amplitude thereof being substantially larger than that of the sustaining pulses; and applying eliminating pulses to the element, the amplitude thereof being substantially smaller than that of the sustaining pulses.

3. A driving method as set forth in claim 2 wherein the amplitude of the writing pulses is varied in order to write the half-tone information.

4. A driving method as set forth in claim 2 wherein the pulse-repetition rate of the writing pulses are controlled in order to write the half-tone information.

5. A driving method as set forth in claim 2 wherein the amplitude and the pulse-repetition rate of the eliminating pulses are varied in order to memorize the half-tone information.

6. A driving method as set forth in claim 2 wherein the electroluminescent element mainly comprises a ZnS (Mn) luminescent layer sandwiched between a pair of dielectric layers.

7. A driving method for a thin-film electroluminescent element comprising an electroluminescent layer sandwiched between two transparent dielectric layers forming a sandwiched structure, said electroluminescent layer having a given threshold voltage level for initiating electroluminescence thereon and said sandwiched structure exhibiting the hysteresis phenomenon within the light emission versus applied voltage characteristics along the increasing and the decreasing process of the amplitude of the applied voltage where the applied voltage exceeds the threshold level, comprising the steps of;

applying alternating sustaining pulses to the element for maintaining the light emission, the amplitude of the sustaining pulses being chosen at the voltage level appearing at the point in the hysteresis loop characteristics where the difference between the minimum light brightness on the voltage increasing curve and the maximum light brightness on the voltage decreasing curve is substantially a maximum applying writing pulses of a pulse-width wider than that of the sustaining pulses; and applying eliminating pulses of a pulse-width narrower than that of the sustaining pulses.

8. A driving method as set forth in claim 7 wherein the pulse-width of the writing pulses and the eliminating pulses are varied in order to write and memorize the half-tone information.

9. A driving method as set forth in claim 1 further comprising the step of applying external light onto the element to apply writing pulses to said element by varying the quantity of light exposure.

10. The method of claim 1, wherein the electroluminescent layer is a thin film of a host material doped by a transition element.

11. The method of claim 10, wherein the host material of the thin film electroluminescent layer is ZnS and the transition element with which it is doped is selected from the group consisting of Mn, Cr, Tb, Er, Tm and Yb.

12. The method of claim 11, wherein the transparent dielectric layers are made of $Y_2O_3$.

13. A circuit arrangement for driving a thin-film electroluminescent element which comprises an electroluminescent layer having a given threshold level for initiating electroluminescence therein, a pair of dielectric layers for sandwiching said electroluminescent layer therebetween to form a three-layer sandwiched structure and a pair of electrodes for supporting said sandwiched structure, said three-layer sandwiched structure being adapted to manifest a remarkable hysteresis loop behavior within the light emission versus applied voltage characteristics along the increasing and decreasing process of the amplitude of applied voltage where the applied voltage exceeds the threshold level, said circuit arrangement comprising:

means for applying a sustaining voltage of an amplitude sufficient to sustain the brightness of the electroluminescent element at a desired value which corresponds to a specific point on the hysteresis curve, for the sustaining of information therein;

means for applying a writing voltage of an amplitude increased to a higher level on the hysteresis curve, for the writing of information, the resulting brightness settling at a higher value even at subsequent sustaining voltage; and means for applying erasing voltage of an amplitude decreased from the sustaining voltage level to a lower level so that the electroluminescent element is restored to its initial state where the brightness is faint.

14. The curcuit arrangement of claim 13, wherein the electroluminescent layer comprises a thin film of a host material doped by a transition element.

15. The circuit arrangement of claim 14, wherein the host material of the thin film electroluminescent layer is ZnS and the transition element with which it is doped is selected from the group consisting of Mn, Cr, Tb, Er, Tm and Yb.

16. The circuit arrangement of claim 15, wherein the transparent dielectric layers are made of $Y_2O_3$.

* * * * *